United States Patent [19]

Ver Nooy et al.

[11] 3,872,880

[45] Mar. 25, 1975

[54] PLUGGING APPARATUS

[75] Inventors: Burton Ver Nooy; Coy D. Osburn, both of Tulsa, Okla.

[73] Assignee: T. D. Williamson, Inc., Tulsa, Okla.

[22] Filed: Feb. 16, 1973

[21] Appl. No.: 332,812

[52] U.S. Cl. .................... 137/317, 138/92, 251/284
[51] Int. Cl. ....................... B23b 41/08, F16c 41/04
[58] Field of Search ........... 137/315, 317, 318, 322; 138/89, 92; 285/197; 251/284

[56] References Cited
UNITED STATES PATENTS

| | | | |
|---|---|---|---|
| 2,696,966 | 12/1954 | Mueller et al. | 137/317 X |
| 2,740,606 | 4/1956 | Koenig | 137/317 X |
| 3,032,069 | 5/1962 | Ficklin | 138/89 |
| 3,302,661 | 2/1967 | Williams | 137/322 |

*Primary Examiner*—Martin P. Schwadron
*Assistant Examiner*—David R. Matthews
*Attorney, Agent, or Firm*—W. F. Hyer; Marvin B. Eickenroht

[57] ABSTRACT

This invention relates to a plugging apparatus for plugging and sealing a side opening in a conduit or vessel while the same is under a pressure other than atmospheric. In a preferred embodiment, the apparatus includes a fluid tight housing adapted to be mounted on the conduit or vessel to surround the opening. A plug carrier is movable through the housing and supports a plug assembly, the latter including a seal support, a seal expander head and a hollow cylindrical resilient seal member between the seal support and expander head. The arrangement is such that in use, the expander head moves into the resilient seal and expands the latter radially outwardly into engagement with the walls of the side opening. The expander head is imperforate so that in plugging position, it acts as a unitary fluid barrier across the interior of the seal member. By making the sealing element and the cylindrical portion of the expander head extending thereinto of sufficient length, an effective seal can be formed with the walls of a side opening in a pipeline, for example, even though such side opening may have a nominal diameter approaching the inside diameter of the pipeline.

5 Claims, 4 Drawing Figures

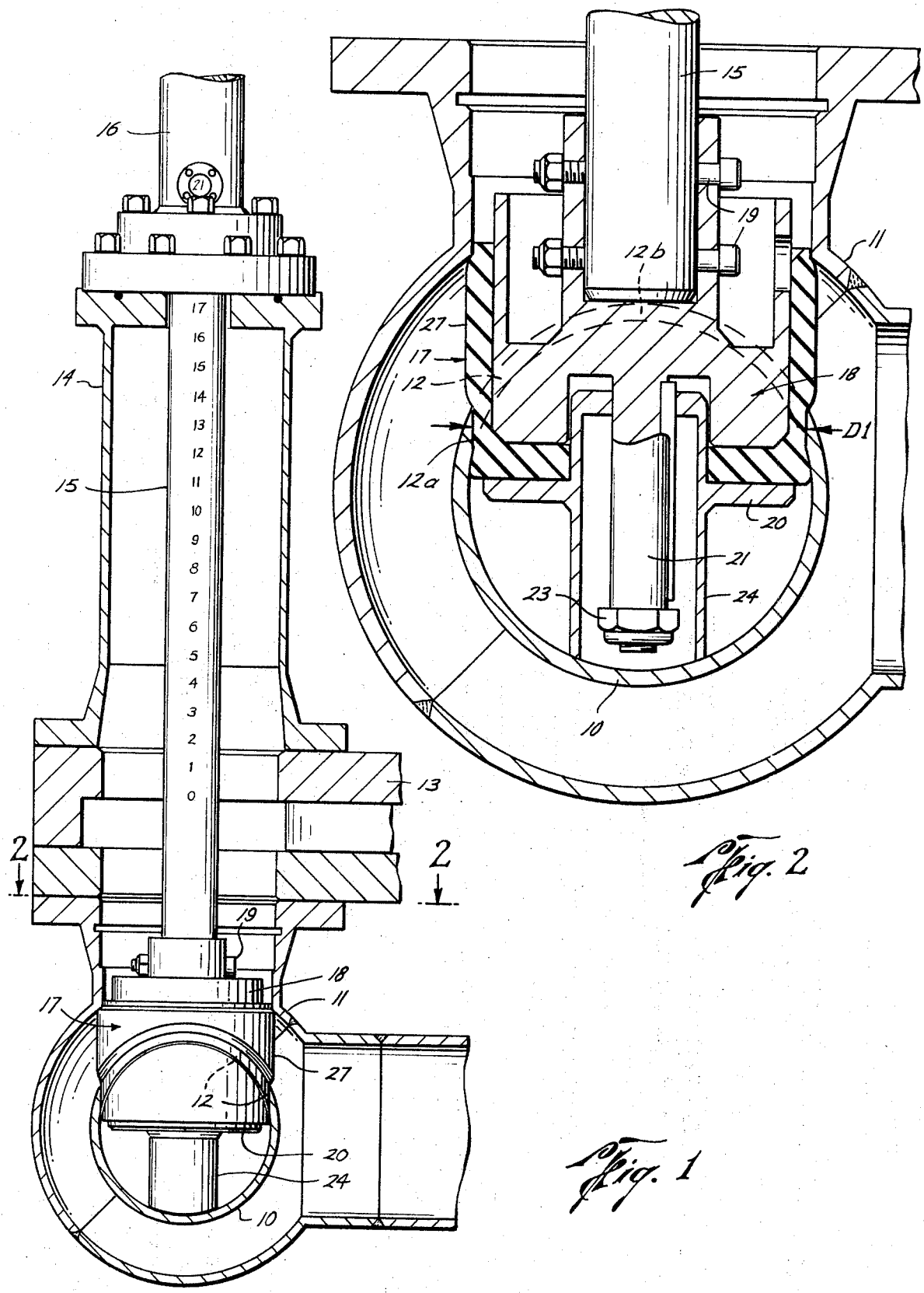

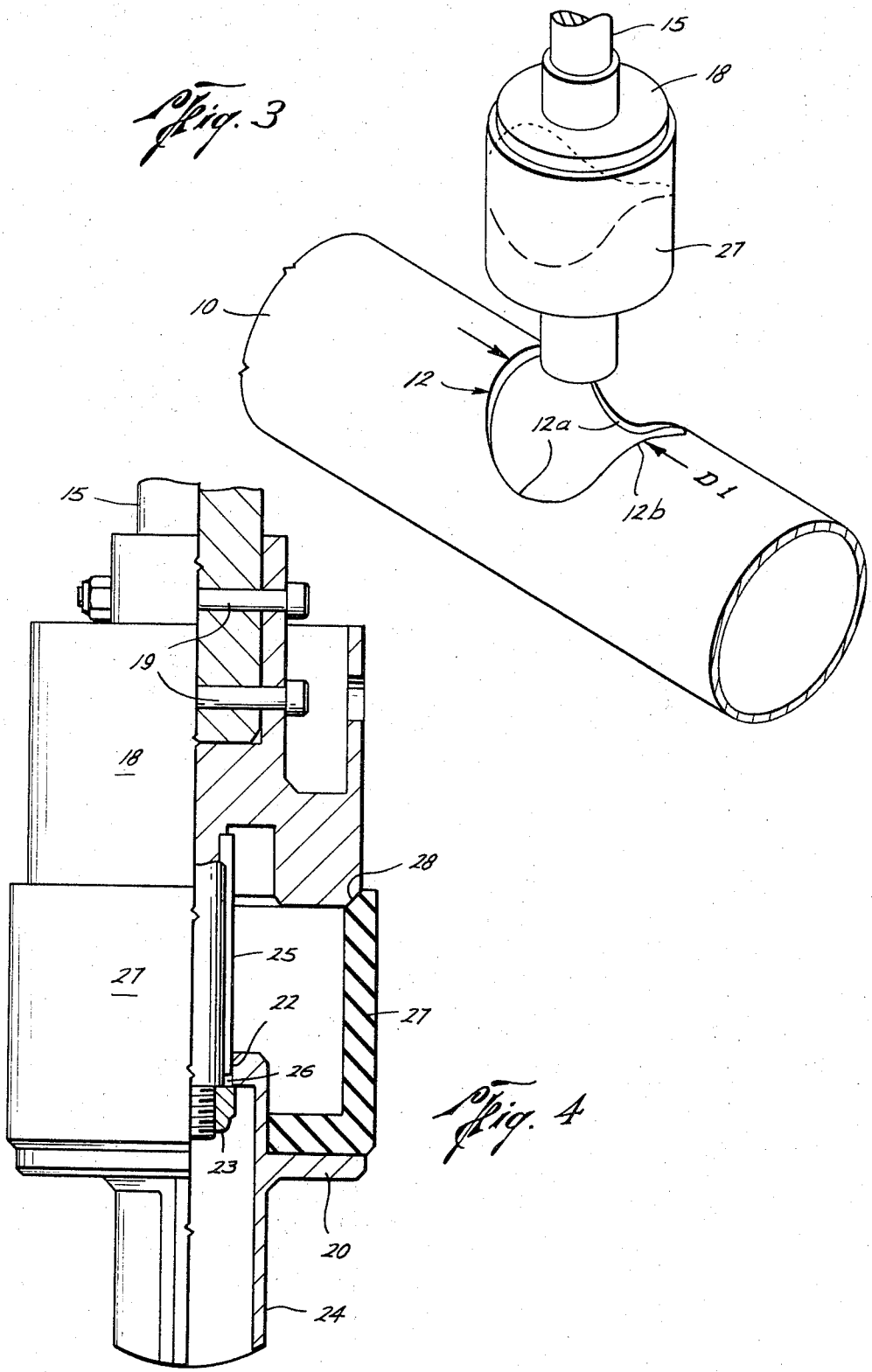

3,872,880

PLUGGING APPARATUS

This invention relates to a plugging apparatus especially adapted for plugging a side opening in a conduit or vessel while the latter is under pressure or vacuum. In one of its aspects, the invention relates to such a plugging apparatus which is especially adapted to plug a side opening in a tee installed in a pipeline without interrupting flow through the main course of the pipeline.

Various apparatus has been suggested for the plugging of conduits and vessels while the same are under a pressure differing from atmospheric. Some of the prior pluggers are designed to extend through a side opening in the pipeline to form a plug across the pipeline to one side of the side opening. These do not plug the side opening per se. Others, such as the one shown in McAllister U.S. Pat. No. 2,170,866 are intended to plug the side opening but not the main course of the pipeline. However, the side opening pluggers heretofore suggested have been subject to one or more disadvantages. For example, the expanding mechanism for the sealing element may be relatively complex and in itself provide for potential leakage through the side opening even though the sealing element is functioning perfectly to perfect its seal with the walls of the side opening. Also, forming a seal with a side opening having a nominal diameter approaching that of the pipeline becomes difficult because of the complex shape of the side opening when viewed in elevation. Thus, referring to VerNooy et al. U.S. Pat. No. 3,544,136, the side opening in the main pipeline when viewed in plan appears to be of a simple circular configuration. However, when viewed in elevation, the configuration is much more complex and it is necessary that the sealing arrangement can be effective over the entire extent of this complex periphery of the side opening.

It is an object of this invention to provide a plugging apparatus which can provide a positive compression type seal with the walls of a side opening in a conduit or vessel to effectively plug the side opening wherein an expander head acts not only to expand a cylindrical sealing member to form such seal but in itself is imperforate so that it can form the major part of the plug.

Another object is to provide such an apparatus which is capable of effectively plugging the side opening in the conduit wherein such side opening has a nominal diameter which is a major portion of the diameter of the conduit so that the edge of the opening is of a relatively complex shape as compared with a simple circular opening through a flat plate, for example.

Another object is to provide such an apparatus which can be of simple construction and yet which is positive in operation.

These and other objects are accomplished, in accordance with the illustrated embodiment of the invention, by providing a fluid tight housing adapted to be mounted on a conduit or vessel to surround a side opening therein and to prevent the escape of fluid from the conduit or vessel. A plug assembly is carried by a plug carrier so as to be movable thereby from a retracted position in the housing to an extended plugging position within the side opening and vice versa. The plug assembly includes a seal support and a seal expander head which are movable toward and away from each other. Disposed between the seal support and expander head is a hollow cylindrical resilient seal member which has an open end for receiving the expander head. The latter has a cylindrical portion which has an outside diameter larger than the inside diameter of the seal member when the latter is in the relaxed state. Thus the cylindrical portion of the expander head can be moved into the seal member through an open end thereof to expand the same so that it has a uniform internal diameter when in expanded condition. This provides a positive compression type seal between the expander head and the walls of the side opening as long as the side opening appears to be circular in configuration when viewed along its axis and regardless of the configuration of the side walls when viewed with the side opening in elevation. Moreover, the expander head is made to be imperforate so that it acts as a unitary fluid barrier across the interior of the expanded seal member.

In the drawings:

FIG. 1 illustrates a preferred embodiment of the invention mounted on suitable fittings connected to the pipeline to permit the plugging of a side outlet which normally is in fluid communication with a tee connected to the pipeline;

FIG. 2 is an enlarged view of the lower portion of FIG. 1 except that the plugging assembly has been shown in vertical cross section;

FIG. 3 is an isometric view illustrating the relationship between a large side opening in a pipeline and the plugging assembly, the other portions of the apparatus shown in FIG. 1 having been eliminated for the purpose of clarity; and FIG. 4 is a view, partially in elevation and partially in section, showing the plug assembly in an unexpanded position.

Referring to the drawings, a pipeline 10 is illustrated as having a split tee 11 connected thereto. This arrangement is further described in VerNooy et al. U.S. Pat. No. 3,544,136 and the disclosure of this patent is incorporated hereinto by reference.

The pipeline 10 has a side opening 12 which is the opening to be plugged. Tee 11 has the usual tapping valve 13 mounted thereon and mounted on the tapping valve is a fluid tight housing 14 which forms a part of the apparatus of this invention. Thus the fluid tight housing is adapted to be mounted to surround the opening 12 in the pipeline and to prevent the escape of fluid to the atmosphere during the plugging operation.

The plugging apparatus also includes a plug carrier movable in the housing 14. Such carrier is here illustrated as including a rod 15 which is reciprocal in the housing by a suitable screw or hydraulic mechanism 16. A plug assembly, designated generally by the numeral 17, is carried by rod 15 for movement between a plugging position as shown in FIG. 1 and a retracted position wherein the plug assembly is retracted to be within the housing 14.

The plug assembly includes an expander head 18 which is here illustrated as being bolted to rod 15 by bolts 19. The plug assembly also includes a seal support here shown to be in the form of a back-up or support plate 20 having a sliding connection with the expander head. As here illustrated, this connection is provided by an extension 21 of the expander head passing through an opening 22 and terminating in a nut 23 which serves to limit the movement of the back-up plate away from the expander head as illustrated in FIG. 4. Also, the back-up plate has a portion or extension 24 adapted to engage an inner wall of a pipeline when the plugging apparatus is being used, all as illustrated best in FIGS.

1 and 2. Preferably, the lower end of extension 24 is curved to conform with the inner surface of the pipeline which it is to abut in order to spread the load incurred during the setting of the plug. To insure that the curved lower end remains in proper alignment with the balance of the plugging apparatus, a key 25 can be provided to slide within a slot 26 to prevent relative rotation between seal support plate 20 and expander head 18.

A hollow cylndrical resilient seal member 27 is provided between the seal support and the expander head and it has an open end for receiving the expander head. The expander head is preferably cylindrical (or at least the portion which extends into the seal member is cylindrical) and has an outside diameter which is larger than the inside diameter of the seal member when the latter is in a relaxed state as shown in FIG. 4. Preferably, the outside diameter of the expander head is intermediate the inside and outside diameters of the seal member. Therefore, when the expander head has moved from its FIG. 4 position into the seal member as shown in FIG. 2, the seal member will have a uniform inside diameter along its effective sealing length. The term "effective sealing length" when used in this context means the axial length of the seal member which is in contact with the opening which is to be plugged and sealed. For example, in FIG. 2, the effective sealing length will be from the edge 12a of opening 12 to the upper edge 12b. Also, the term "nominal diameter of the side opening" is defined to mean the diameter "D1" as indicated in FIGS. 2 and 3 and this is effectively the diameter one observes when looking directly into the pipeline along the axis of the opening 12.

Thus it will be seen that when the plugging apparatus is as seated in FIG. 2, a portion of the sealing element directly between the sidewall of the opening and the outer wall of the expander head is compressed to form a positive compression type seal even though this outer wall may rise upwardly with respect to the expander head as shown by the dashed lines in FIG. 2. Thus there is in effect a band of the seal member which extends entirely around the expander head and is compressed thereby against the edges of the side opening to form the compression type seal. This will be true regardless of the contour of the side opening when viewed in elevation (as in FIG. 2) as long as the opening is round when viewed along its axis.

It will be noted that the expander head is imperforate in the sense that there are no passages extending therethrough from one end to the other. With such construction, the expander head acts as a unitary fluid barrier across the interior of the seal member and there is no need for the seal member to be bonded or otherwise sealed to any of the other portions of the plug assembly as the only necessary seal is the compression seal between the expander head and the walls of the side opening.

The seal member can be made of any suitable material such as rubber but preferably it is made of polyurethane.

The operation of the preferred embodiment is believed to be apparent from the foregoing but to insure completeness, a brief description thereof will be given. After the tapping valve 13 has been opened, rod 15 is moved downwardly to move the plug assembly into the side opening. When extension 24 encounters the inside wall of the pipeline, the expander head begins to move downwardly with respect to the support plate and in so doing, moves down into the seal member to expand same. To facilitate this, the lower end of the expander head can be levelled as at 28. The expander head then continues its downward movement through the seal member until the head reaches its FIG. 2 position at which time the seal is perfected. To remove the plug assembly, rod 15 is moved upwardly to move the expander head to the FIG. 4 position and the plug assembly is moved into housing 14.

From the foregoing description of one embodiment of this invention by way of example, it will be seen that this invention is one well adapted to attain all of the ends and objects hereinabove set forth, together with other advantages which are obvious and which are inherent to the apparatus.

The invention having been described, what is claimed is:

1. A plugging apparatus especially adapted to plug and seal a side opening in the wall of a pipeline while the pipeline is under pressure differing from atmospheric and wherein the side opening has a nominal diameter which is a major portion of the diameter of the pipeline which comprises, in combination; a fluid tight housing adapted to be mounted on a pipeline to surround a side opening therein; a plug carrier reciprocal in said housing; a back-up plate carried by said carrier and having a portion adapted to engage an inner wall of a pipeline when the plugging apparatus is being used, a hollow cylindrical resilient sealing element surrounding the carrier and having one end resting on said back-up plate and the other end open, and a unitary solid cylindrical imperforate expander head on the carrier slidably movable into said sealing element through the open end thereof to a sealing position responsive to movement of the plug carrier; said sealing element, when in a relaxed state, having an outside diameter less than the diameter of a side opening to be plugged and said expander head having an outside diameter intermediate the inside and outside diameters of said sealing element, when the latter is in a relaxed state, so that as said head moves into the sealing element, the head radially expands the sealing element by mechanically displacing it outwardly into engagement with the edges of a side opening; said head when in sealing position having portions lying opposite such edges of a side opening with the sealing element being comprised between such head portions and such edges.

2. The apparatus of claim 1 wherein said expander head is fixed to the plug carrier and has an extension having a slidable connection with said back-up plate.

3. The apparatus of claim 1 wherein the expander head has a bevel at its end to facilitate movement of the head into the sealing element.

4. A plugging apparatus adapted to plug and seal a side opening in the wall of a conduit or vessel while the conduit is under pressure differing from atmospheric which comprises, in combination; a fluid tight housing adapted to be mounted on a conduit or vessel to surround a side opening therein; a plug carrier movable in said housing; a plug assembly carried by the carrier and including a seal support and a seal expander head movable toward and away from each other and a hollow cylindrical resilient seal member between the seal support and expander head and having an open end for receiving the expander head; said expander head having a portion which is cylindrical and has an outside diameter larger than the inside diameter of the seal member when the latter is in a relaxed state; said expander head portion being movable responsive to movement of the plug carrier into the cylindrical seal member through the latter's open end and thence into the interior of the seal member to radially expand the seal member by mechanically displacing it outwardly so that the seal member has a substantially uniform inside diameter along its effective sealing length, said expander head being imperforate and having portions arranged to be opposite to the walls of a side opening and pressing the seal member into engagement with such walls when the plugging apparatus is plugging a side opening, the expander head thus acting not only to maintain the seal member in sealing engagement with the walls of a side opening but also as a unitary fluid barrier across the interior of the seal member; said seal support including a portion adapted to engage an inner wall of a conduit or vessel when the plugging apparatus is being used.

5. The plugging apparatus of claim 4 wherein the length of the sealing member and of the cylindrical head portion of the expander head are long enough that the sealing member will engage the entire periphery of a side opening in a conduit when such side opening has a nominal diameter which is a major portion of the diameter of the conduit.

* * * * *